United States Patent

Staller

[15] 3,638,510
[45] Feb. 1, 1972

[54] SHIFTING ARRANGEMENT USING A REVERSIBLE GENEVA DRIVE

[72] Inventor: Karel Jan Staller, Rutherford, N.J.
[73] Assignee: International Telephone and Telegraph Corporation, Nutley, N.J.
[22] Filed: Nov. 26, 1969
[21] Appl. No.: 880,256

[52] U.S. Cl. ............................................74/436, 74/355
[51] Int. Cl. ..................................F16h 27/06, F16h 3/40
[58] Field of Search........................74/436, 820, 84, 404, 355

[56] References Cited

UNITED STATES PATENTS

| | | | |
|---|---|---|---|
| 1,571,653 | 2/1926 | Textorius | 74/436 |
| 2,795,150 | 6/1957 | Seidler | 74/84 X |
| 3,234,819 | 2/1966 | Zuse | 74/436 X |
| 3,361,005 | 1/1968 | Carpenter | 74/84 X |
| 3,456,521 | 7/1969 | Maaden | 74/436 |

FOREIGN PATENTS OR APPLICATIONS

| | | | |
|---|---|---|---|
| 962,615 | 12/1949 | France | 74/436 |
| 350,896 | 3/1922 | Germany | 74/436 |

*Primary Examiner*—Carlton R. Croyle
*Assistant Examiner*—Thomas C. Perry
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

An arrangement to shift a carriage carrying characters of printers from one position to another by means of a geneva drive. The same drive is used to reverse the shift of the carriage by means of a control camming means such that only one driving pin can engage the geneva gear at a given time.

10 Claims, 3 Drawing Figures

PATENTED FEB 1 1972

3,638,510

INVENTOR
KAREL J. STALLER
BY
Kenneth J. Lombardi
ATTORNEY

SHIFTING ARRANGEMENT USING A REVERSIBLE GENEVA DRIVE

BACKGROUND OF THE INVENTION

In general this application relates to an indexing arrangement to shift a carriage from one position to another, and more particularly to a shifting arrangement utilizing a reversible geneva drive to accurately position a character carriage.

Various means have been used to shift forward and backward a carriage carrying characters of printers. Some of these known arrangements include gear racks oscillating with amplitude equal to the horizontal distance of the characters, and other arrangements utilize screws rotating in steps using a ratchet. Yet, one of the most exacting indexing devices known, is the geneva drive. Incorporating this drive into a shifting arrangement which is reversible will insure quiet and effective indexing motion in both the forward and the reverse direction. This type of arrangement is very desirable in printers where exact incrementing forward and backward is required.

SUMMARY OF THE INVENTION

An object of this invention is to provide a shifting arrangement using a reversible geneva drive.

Another object of this invention is to include provision which insures the reversing motion only during the smooth portion of the drive.

According to the broader aspects of the invention there is provided a maltese cross which is selectively driven by a forward or reverse drive gear according to a control camming means, and the smooth engagement of either drive gear is assured by an associated locking cam and lever.

BRIEF DESCRIPTION OF THE DRAWINGS

The shifting arrangement using a reversible geneva drive will more easily be understood if reference is made to the following description taken in connection with the drawings in which.

DESCRIPTION OF THE PREFERRED EMBODIMENT

Figure 1:
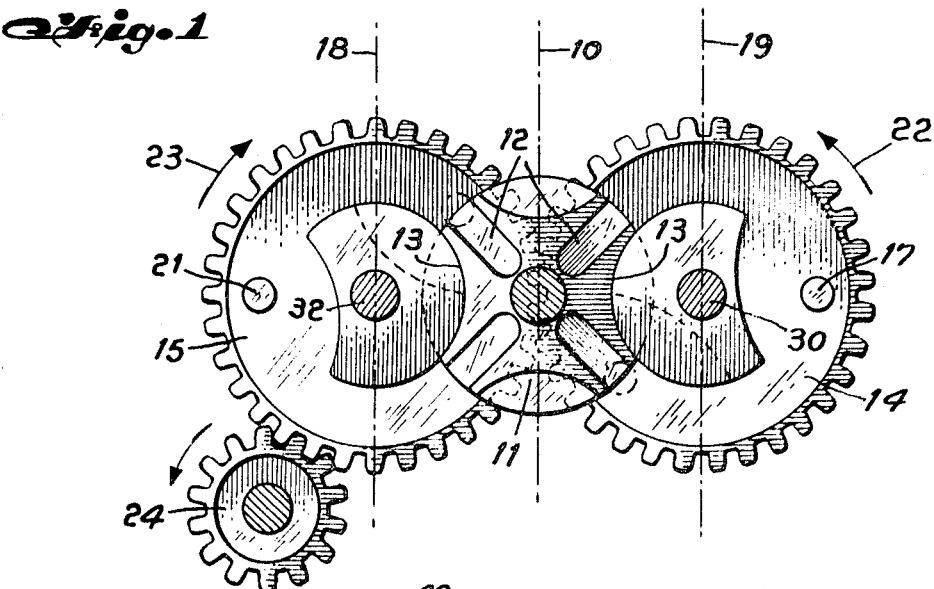
FIG. 1 illustrates the reversible geneva movement according to the invention.

The geneva movement according to the invention may easily be understood by referring firstly to FIG. 1. On a center axis 10, is positioned a maltese cross 11 having four grooves 12 and four smooth cylindrical surfaces 13. Positioned in opposition are two gears 14, 15, the forward drive gear 14 having a cylindrical hub portion 16 for engaging the cylindrical surface portion 13 of the cross. A forward drive pin 17 is positioned for engaging the grooves 12 of the cross and indexing the cross in its precise motion. Positions about the axis 18 opposite and parallel to the axis 19 is the reverse drive gear 15. Reverse drive gear 15 also includes a cylindrical hub portion 20 and a reverse drive pin 21 for engaging the grooves 12 and indexing the cross 11 in the reference direction as indicated by the arrows 22, 23. Although the nomenclature has been defined as reverse and forward for a particular gear, it should be evident that either gear may rotate in either direction according to a rotation of the drive pinion 24 which is coupled to a drive motor (not shown). The continuous rotation of both the forward and reverse gears is by virtue of their continuous coupling as further illustrated in FIG. 2.

Figure 2:
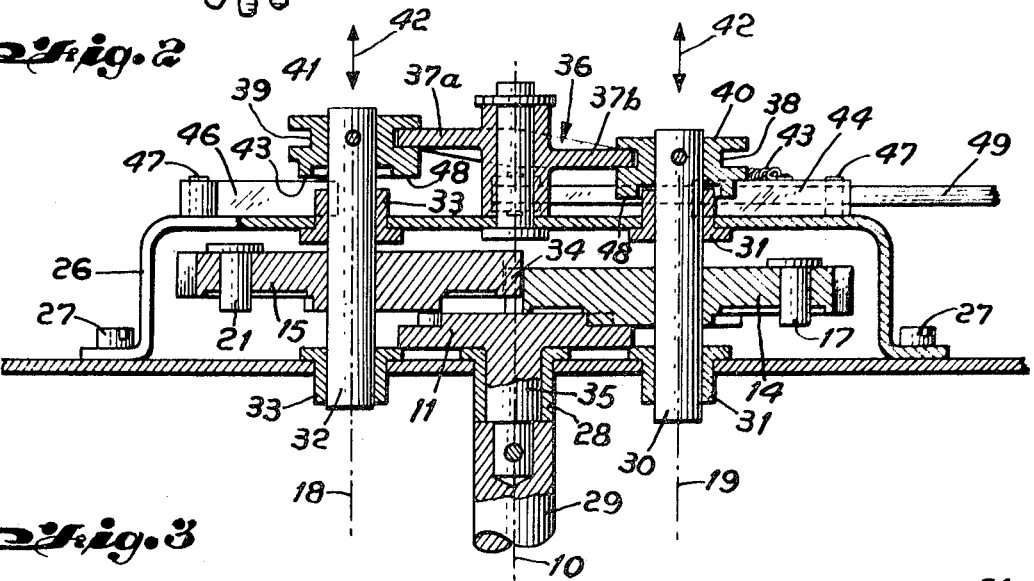
FIG. 2 is a cross-sectional view of the shifting arrangement according to the invention.

Referring additionally to FIG. 2, a lower mounting plate 25 and an upper mounting plate 26 is shown, the upper mounting plate 26 being fixed by, for example, screws 27. The Maltese cross 11 is rotatably mounted in the lower mounting plate by a sleeve bearing 28 and attached to the carriage drive shaft 29. The cross 11 is mounted in the center axis 10 of the arrangement. Forward drive shaft 30 is rotatably mounted in a parallel axis 19 by sleeve bearings 31 in both the upper and lower shaft. This permits not only rotation of the forward drive shaft 30 but also vertical motion as indicated hereinafter. Attached to the drive shaft is the forward drive gear 14 with forward drive pin 17.

Oppositely mounted on the other parallel axis 18 is a reverse drive shaft 32 rotatably mounted in sleeve bearings 33 in both the upper and lower mounting plate so as to be vertically movable. The vertical motion of the shafts 30, 32 are limited so that the forward and reverse drive gears are always in an engagement 34 even though only one or the other gear is engaging at 35 the Maltese cross.

Mounted in the center axis 10, on the upper mounting plate, is a controlled camming means 36 whose rotation causes the vertical motion of either the forward or reverse drive shafts. The control cam disc 37 is inclined as illustrated and engages circumferential grooves 38, 39 in a forward locking cam 40 and reverse locking cam 41. The cams 40, 41 are attached to the forward and reverse drive shafts 30, 32 and rotate with the drive shafts. Rotation of the control camming means 36 causes the vertical motion of the forward and reverse drive shafts in an upward or downward direction indicated by arrow 42. Whether the high cam disc portion 37a or the low cam disc portion 37b engages the respective grooves 38, 39 of the locking cams 40, 41 as illustrated.

A further feature of the invention is provided which insures smooth and quiet engagement, and shifting only during those portions when the Maltese cross is in a rest position, i.e., the position in which the cylindrical hub portions 16, 20 of the drive gears and the cylindrical portion 13 of the cross are in selective engagement. This is accomplished by including a locking slot cut out portion 43 in the lower portion of each locking cam 40, 41 for a predetermined portion of the circumference of the locking cam. Also, included is a forward locking lever 44 which is pivotally mounted at 45, and a reverse locking lever 46 also pivotally mounted at 47. As shown, the levers 44, 46 are only permitted to engage the slot portion 43 when the drive pins are in the positions shown, that is the hub and cylindrical surface portions are in engagement. When the drive pin 17, 21 of either drive gear 14, 15 is engaged in a groove 12 of the cross, then the locking lever is positioned under the surface 48, and insertion of the drive gear is not possible because the locking lever blocks the downward vertical motion.

Figure 3:
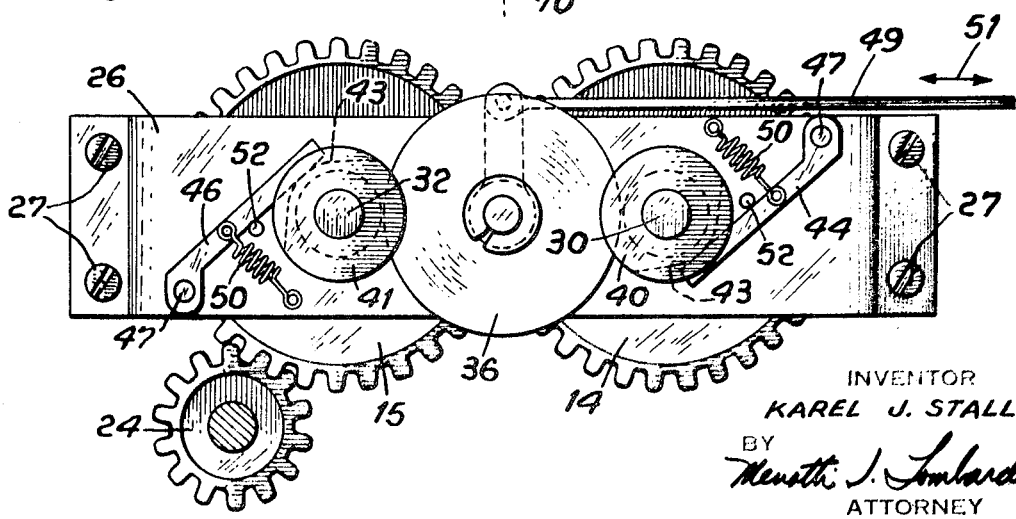
FIG. 3 is a top view of the cross-sectional view shown in FIG. 2.

This locking feature is further illustrated in FIG. 3. The controlled camming means 36 has a lever arm 49 attached to initiate the rotation of cam 36 and thereby to each locking cam 40, 46. The forward locking lever 44 and reverse locking lever 46 each included a spring 50 for urging each lever toward the center of its respective forward and reverse locking cam. When, as shown, the locking lever engages the locking slot cut out portion 43 during rotation of each locking cam, then vertical motion is possible by movement of the lever arm 49 in the direction 51.

A stop pin 52 can be inserted in the top plate 26 to limit the inward travel of the locking levers 40, 41.

The arrangement described is a reversible geneva drive with unique provisions for reversing the motion only in the quiet position of the shaft to the carriage. A Maltese cross with four grooves, mates with drive pins rotating about their individual and parallel axes. The drive gears can only be shifted into grip with the cross alternately. This is controlled by a camming means which is swivelly rotated about the same axis as the cross. Locking levers are included which grip rotating locking cams so that axial motion of the drive gears is not permitted unless the smooth cylindrical surface of a drive gear and cross are engaged. This insures a quiet insertion during shift of the carriage shaft. The arrangement provides exact shifting in a forward or reverse direction of the carriage mounted on the carriage shaft.

Although I have described an embodiment of the invention in connection with specific apparatus, it is to be clearly un-

I claim:

1. Shifting arrangement comprising:
   a Maltese cross;
   first and second means continuously rotating in a respective forward and reverse direction;
   control cam means to control the selective engagement of said first and second means with said cross;
   locking means coupled to said first and second means and to said control means to insure smooth engagement of said first and second means only during predetermined portions of their rotation; and
   said locking means including
      a locking cam mounted on each side of said first and second means, said cam having a circumferential groove adapted to engage said control cam and a locking slot portion positioned at another portion of its circumference for a predetermined amount, and
      a locking lever mounted to abut said locking cam and thereby engage said locking slot portion during a predetermined portion of the rotation of said locking cam.

2. Shifting arrangement comprising:
   a Maltese cross rotatably mounted on a center axis;
   a first drive gear mounted on a first shaft in a first axis parallel to said center axis, said forward gear having means for indexing said cross in a first direction;
   a second drive gear engaging said first drive gear and mounted on a second shaft in a second axis parallel to said first and center axis;
   controlled camming means rotatably mounted in said center axis for controlling the selective engagement of said cross by said drive gear;
   means for coupling said control cam means to said drive gears and for insuring a time selective engagement of each said drive gears; and
   means for providing a continuous drive to both said first and second drive gears.

3. The arrangement of claim 2 wherein said means for coupling and insuring a time engagement includes a locking cam mounted on each of said shaft, said cam having a circumferential groove adapted to engage said control cam, and said cam having a locking slot portion positioned at another portion of its circumference for a predetermined amount.

4. The arrangement of claim 3 including means for mounting said control cam in a rotatable manner and for mounting said first and second shafts in a rotatably and axial movable manner.

5. The arrangement of claim 4 including a locking lever and means associated therewith to cause contact of said lever with said locking cam and thereby engage said locking slot portion to prevent axial movement of said drive gears during a predetermined portion of said locking cam.

6. The arrangement of claim 5 including means for selectively rotating said control cam means, whereby rotation of said control camming means causes axial movement of said first and second driving gears unless prevented by said locking lever during the predetermined portion of the rotation of said locking cam.

7. Shifting arrangement comprising:
   a Maltese cross;
   first and second rotating drive means for selectively engaging said cross to drive it in a forward and reverse direction;
   control cam means to control the selective engagement of said cross;
   first and second locking means respectively coupled to said first and second driving means and engaging said control means, said first and second locking means to insure the selective engagement of said first and second drive means and said cross only during predetermined portions of the rotation of said cross; and
   said first and second locking means each including
      a locking cam mounted on said drive means, said cam having a circumferential groove adapted to engage said control cam and a locking slot portion positioned at another portion of its circumference for a predetermined amount, and
      a locking lever and means associated therewith to cause contact of said lever with said locking cam and thereby engage said locking slot portion during a predetermined portion of the rotation of said locking cam.

8. Shifting arrangement comprising:
   a Maltese cross rotatably mounted on a center axis;
   a continuously rotating first drive gear mounted on a first shaft in a first axis parallel to said center axis, said forward gear having pin means for indexing said cross in a first direction;
   a continuously rotating second drive gear engaging said first drive gear and mounted on a second shaft in a second axis parallel to said first and center axis;
   controlled camming means rotatably mounted in said center axis for controlling the selective engagement of said cross by one of said drive gears;
   means for coupling said control cam means to said drive gears and for insuring a time selective engagement of each said drive gears; and
   means coupled to one of said drive gears for providing a continuous drive to both said first and second drive gears.

9. The arrangement of claim 8 wherein said means for coupling and insuring a time engagement includes:
   a locking cam mounted on each of said shafts, said cam having a circumferential groove attached to meet said control cam and a locking slot portion positioned at another portion of its circumference for a predetermined amount; and
   a locking lever and means associated therewith to cause abutment of said lever with said locking cam, whereby said locking slot portion is engaged to prevent axial movement of said drive gears during a predetermined portion of said locking cam.

10. The arrangement of claim 9 including means for selectively rotating said control cam means, whereby rotation of said control camming means causes axial movement of said first and second driving gears unless prevented by said locking lever during the predetermined portion of the rotation of said locking cam.

* * * * *